United States Patent
Son et al.

(10) Patent No.: US 12,436,838 B2
(45) Date of Patent: Oct. 7, 2025

(54) MEMORY CONTROLLER AND MEMORY SYSTEM INCLUDING THE SAME

(71) Applicant: SK hynix Inc., Gyeonggi-do (KR)

(72) Inventors: Jae Yong Son, Gyeonggi-do (KR); Dae Sung Kim, Gyeonggi-do (KR); Min Su Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 116 days.

(21) Appl. No.: 18/447,326

(22) Filed: Aug. 10, 2023

(65) Prior Publication Data

US 2024/0281321 A1 Aug. 22, 2024

(30) Foreign Application Priority Data

Feb. 17, 2023 (KR) ......................... 10-2023-0021639

(51) Int. Cl.
 *G06F 11/10* (2006.01)
(52) U.S. Cl.
 CPC .................................. *G06F 11/10* (2013.01)
(58) Field of Classification Search
 CPC .... G06F 11/10; G06F 11/1068; G06F 11/141; G06F 11/1012; G06F 11/1044; G06F 11/1048; G06F 3/0658; G11C 11/5642; G11C 2029/0411; G11C 2029/5004; G11C 29/021; G11C 29/028; G11C 7/14; G11C 16/26; H03M 13/1108; H03M 13/1111; H03M 13/3707; H03M 13/612; H03M 13/6325

See application file for complete search history.

(56) References Cited

U.S. PATENT DOCUMENTS

| | | | |
|---|---|---|---|
| 9,741,431 B2 | 8/2017 | Kumar et al. | |
| 10,276,247 B2* | 4/2019 | Alhussien | H03M 13/3723 |
| 10,803,930 B2* | 10/2020 | Kiyooka | G11C 16/26 |
| 2015/0256201 A1* | 9/2015 | Sakurada | H03M 13/1111 |
| | | | 714/719 |
| 2017/0148510 A1* | 5/2017 | Bazarsky | G11C 11/5642 |
| 2017/0236592 A1* | 8/2017 | Alhussien | G11C 7/1006 |
| | | | 714/721 |
| 2020/0159447 A1* | 5/2020 | Luo | G06F 3/0679 |
| 2022/0027089 A1* | 1/2022 | Zeng | G06F 3/0679 |

FOREIGN PATENT DOCUMENTS

KR 10-2016-0046467 A 4/2016

* cited by examiner

*Primary Examiner* — Albert Decady
*Assistant Examiner* — Grace V Braden
(74) *Attorney, Agent, or Firm* — IP & T GROUP LLP

(57) ABSTRACT

Provided herein may be a memory controller and a memory system including the same. The memory controller may include an error correction circuit configured to perform error correction decoding on data that is read by read retry operations, a buffer memory configured to store decoding history information including retry fail voltages used for a failure in the read retry operations and syndrome weights respectively corresponding to the retry fail voltages, and a processor configured to, when a number of times that the read retry operations fail reaches a threshold number of times, determine a voltage corresponding to a minimum syndrome weight determined based on a relationship between changes in the syndrome weights relative to magnitudes of the retry fail voltages, to be an optimally estimated read voltage, and provide data that is read using the optimally estimated read voltage to the error correction circuit.

17 Claims, 11 Drawing Sheets

FIG. 4

$$\begin{bmatrix} 1 & 0 & 1 & 0 & 1 & 1 & 0 \\ 0 & 1 & 0 & 1 & 1 & 1 & 0 \\ 1 & 0 & 0 & 1 & 0 & 1 & 1 \end{bmatrix} \times \begin{bmatrix} C_{i1} \\ C_{i2} \\ C_{i3} \\ \vdots \\ C_{i7} \end{bmatrix} = \begin{bmatrix} S_{i1} \\ S_{i2} \\ S_{i3} \end{bmatrix}$$

H            $C_i^T$           $S_i$

H = Parity Check Matrix
Ci = Read Data
Si = Syndrome

FIG. 6
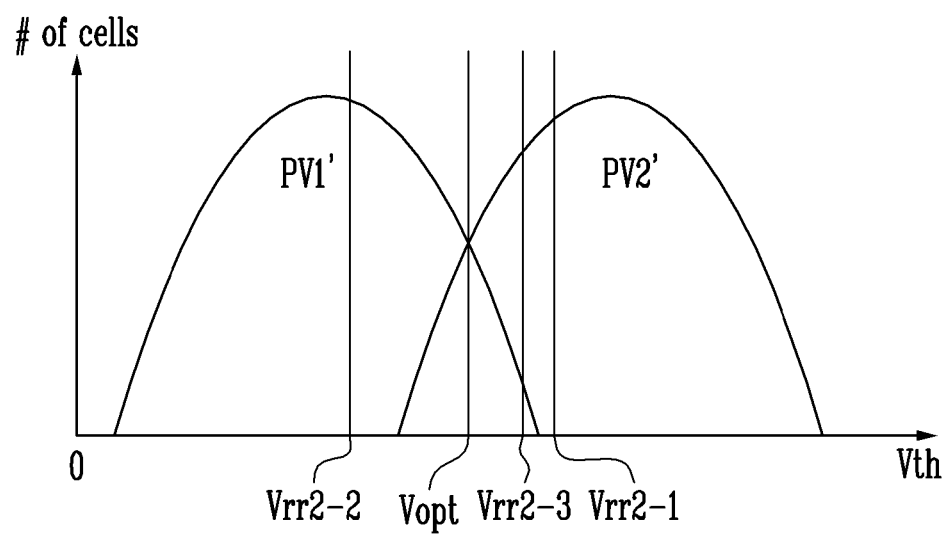
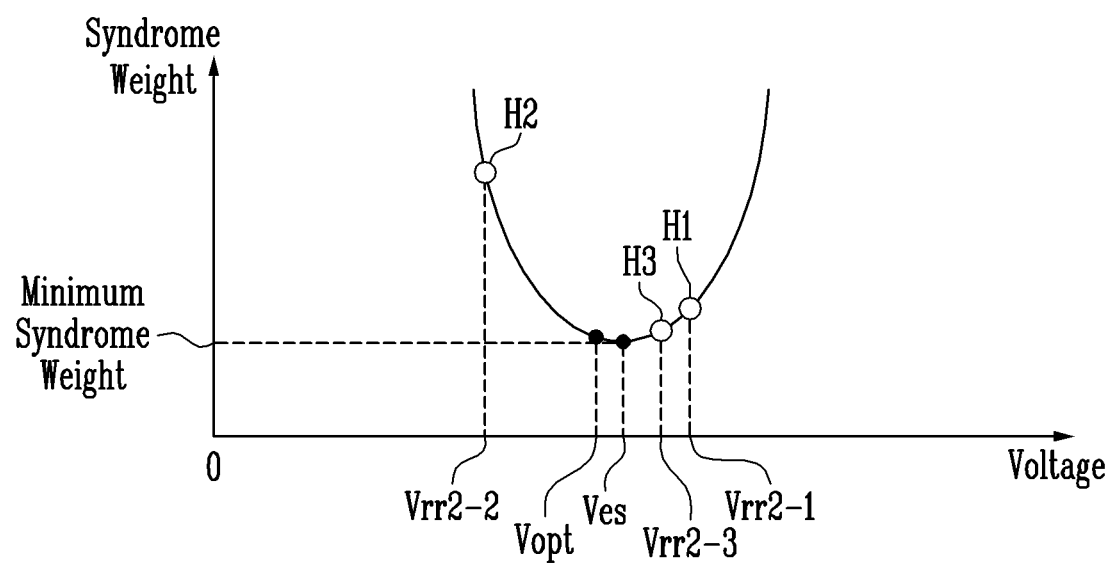

FIG. 7

Read Retry Table 231

| RR Step | Read Retry Voltage |
|---------|--------------------|
| RR1     | Vrr2-1             |
| RR2     | Vrr2-2             |
| RR3     | Vrr2-3             |
| RR4     | Vrr2-4             |
| RR5     | Vrr2-5             |
| ...     | ...                |
| RRn     | Vrr2-n             |

RR1 Fail → H1
RR2 Fail → H2
RR3 Fail → H3
RR4 Fail → H4
RR5 Fail → H5

Decoding History 232

| History | Retry Fail Voltage | Syndrome Weight |
|---------|--------------------|-----------------|
| H1      | Vrr2-1             | SW1             |
| H2      | Vrr2-2             | SW2             |
| H3      | Vrr2-3             | SW3             |
| H4      | Vrr2-4             | SW4             |
| H5      | Vrr2-5             | SW5             |

MEMORY CONTROLLER AND MEMORY SYSTEM INCLUDING THE SAME

CROSS-REFERENCE TO RELATED APPLICATION

The present application claims priority under 35 U.S.C. § 119(a) to Korean patent application number 10-2023-0021639 filed on Feb. 17, 2023, the entire disclosure of which is incorporated by reference herein.

BACKGROUND

1. Field of Invention

Various embodiments of the present disclosure relate to an electronic device, and more particularly to a memory controller and a memory system including the memory controller.

2. Description of Related Art

A memory system is a device which stores data under the control of a host device such as a computer or a smartphone. The memory system may include a memory device in which data is stored and a memory controller which controls the memory device. Memory devices are classified into a volatile memory device and a nonvolatile memory device.

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

A read operation may be an operation of obtaining data stored in memory cells using a read voltage. Threshold voltage distributions of memory cells may be changed as a read operation is repeated. When the threshold voltages of memory cells are changed, data obtained by the read operation may include a large number of error bits. When data obtained by the read operation includes a large number of error bits, correction of the error bits may be impossible. The memory system may perform a read operation by changing a read voltage so as to obtain data including a small number of error bits.

SUMMARY

Various embodiments of the present disclosure are directed to a memory controller that is capable of reading data including a small number of error bits, and a memory system including the memory controller.

An embodiment of the present disclosure may provide for a memory controller. The memory controller may include an error correction circuit configured to perform error correction decoding on data that is read by read retry operations, a buffer memory configured to store decoding history information including retry fail voltages which failed in the read retry operations and syndrome weights respectively corresponding to the retry fail voltages, and a processor configured to determine, when a number of times that the read retry operations fail reaches a threshold number of times, a minimum syndrome weight based on a relationship between changes in the syndrome weights relative to the retry fail voltages, determine an optimally estimated read voltage corresponding to the minimum syndrome weight, and provide data that is read using the optimally estimated read voltage to the error correction circuit.

An embodiment of the present disclosure may provide for a method of operating a memory controller. The method may include sequentially performing first to k-th read retry operations among first to n-th read retry operations, storing first to k-th read retry voltages used for the respective first to k-th read retry operations, and first to k-th syndrome weights corresponding to the respective first to k-th read retry voltages, determining, when the first to k-th read retry operations fail, a minimum syndrome weight based on a relationship between changes in the first to k-th syndrome weights relative to the first to k-th read retry voltages, determining an optimally estimated read voltage corresponding to the minimum syndrome weight, and reading data stored in a memory device using the optimally estimated read voltage.

An embodiment of the present disclosure may provide for a memory system. The memory system may include a memory device, and a memory controller configured to determine a minimum syndrome weight based on a graph indicating a relationship between retry fail voltages and respectively corresponding syndrome weights, and control the memory device to read data stored in the memory device using an optimally estimated read voltage corresponding to the minimum syndrome weight. The retry fail voltages are used in up to one of a plurality of read retry operations of reading data stored in the memory device using read retry voltages having different magnitudes, and syndrome weights respectively corresponding to the retry fail voltages.

An embodiment of the present disclosure may provide for a method of operating a controller. The method may include performing read retry operations with respective first read voltages while recording a number of ones (1s) included in each of syndromes as results of the individual read retry operations, performing, when the read retry operations fail, a first read operation with an estimated read voltage, and performing, when the first read operation fails, a second read operation with second read voltages with respect to the estimated read voltage. Each of the read retry operations and the first read operation includes a hard-decision decoding operation, and the first read voltages and the estimated read voltage are hard-decision read voltages, the second read operation includes a soft-decision decoding operation, and the second read voltages are soft-decision read voltages, the estimated read voltage corresponds to a minimum syndrome according to regression analysis on a relationship between the first read voltages and the syndromes, and the minimum syndrome has a minimum number of 1s according to the regression analysis.

BRIEF DESCRIPTION OF THE DRAWINGS

FIG. 4 is a diagram illustrating error correction decoding.

FIG. 6 is a diagram illustrating an operation of determining an optimally estimated read voltage based on decoding history information according to an embodiment of the present disclosure.

FIG. 7 is a diagram illustrating a decoding history storage according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
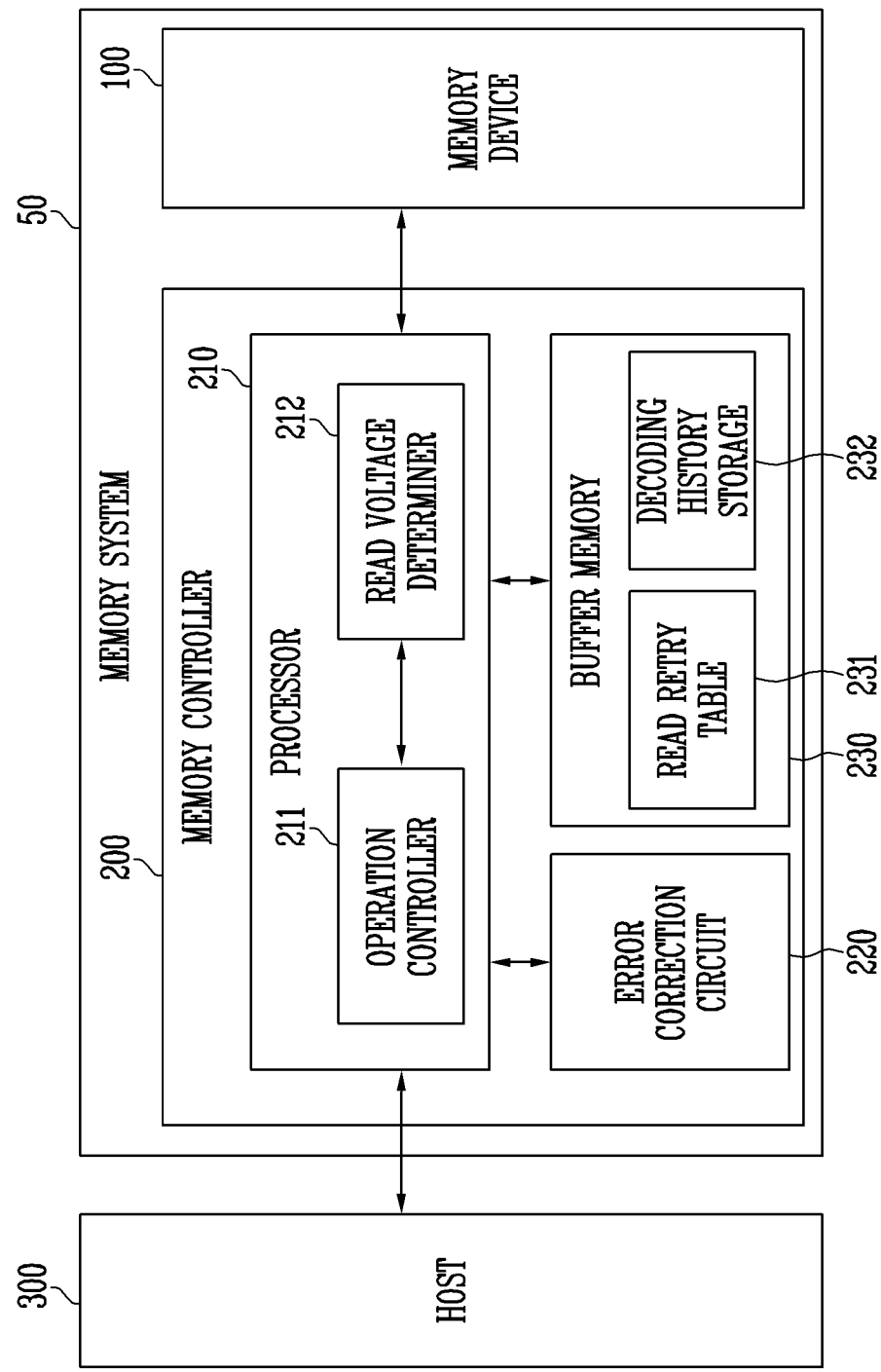
FIG. 1 is a diagram illustrating a memory system including a memory controller and a memory device according to an embodiment of the present disclosure.

FIG. 1 is a diagram illustrating a memory system including a memory controller and a memory device according to an embodiment of the present disclosure.

Referring to FIG. 1, a memory system 50 may include a memory device 100 and a memory controller 200. The memory system 50 may be a device that is included in a mobile phone, a computer, an in-vehicle infotainment system, or the like and that stores data under the control of a host 300 which is an external device.

The memory system 50 may be manufactured as various types of storage devices such as a solid state drive (SSD) and a universal flash storage (UFS) depending on a host interface that is a scheme for communication with the host 300. The memory system 50 may be manufactured in various types of package forms such as a system-on-chip (SOC).

The memory device 100 may store data. The memory device 100 may be operated under the control of the memory controller 200. In an embodiment, the memory device 100 may be a nonvolatile memory device or a volatile memory device.

The memory device 100 may receive a command and an address from the memory controller 200, and may perform an operation indicated by the command on an area selected by the address. The memory device 100 may perform a program operation (write operation) of storing data in the area selected by the address, a read operation of reading data, or an erase operation of erasing data.

The memory controller 200 may control the overall operation of the memory system 50.

When power is applied to the memory system 50, the memory controller 200 may run firmware (FW). In an embodiment, the memory controller 200 may control communication between the host 300 and the memory device 100 by running the firmware. In an embodiment, the memory controller 200 may translate a logical address of the host into a physical address of the memory device.

The memory controller 200 may control the memory device 100 so that a program operation, a read operation or an erase operation is performed in response to a request received from the host 300. The memory controller 200 may provide a command, a physical address, or data to the memory device 100 depending on the write operation, the read operation or the erase operation.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and program operations that are involved in performing wear leveling, read reclaim, garbage collection, etc.

In an embodiment, the memory controller 200 may control two or more memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

The host 300 may communicate with the memory system 50 using various communication schemes such as a dual in-line memory module (DIMM).

In an embodiment, the memory controller 200 may include a processor 210, an error correction circuit 220, and a buffer memory 230. The buffer memory 230 may include a read retry table 231 and a decoding history storage 232.

The processor 210 may control the operation of the memory controller 200 and the memory device 100. The processor 210 may control a program operation of storing received data in the memory device 100 in response to a write request received from the host 300. The processor 210 may control a read operation of reading data stored in the memory device 100 in response to a read request received from the host 300.

In an embodiment, the processor 210 may include an operation controller 211 and a read voltage determiner 212. In an embodiment, the operation controller 211 may read the data stored in the memory device 100 in response to a request received from the host 300. The operation controller 211 may provide the data, read by the read operation, to the error correction circuit 220.

The error correction circuit 220 may perform error correction decoding of correcting errors in the data read by the read operation. When the number of error bits included in the data read by the read operation is less than the reference number of correctable error bits, error correction decoding may pass. When error correction decoding passes, the operation controller 211 may provide the decoded read data to the host 300.

However, when the number of error bits included in the data read by the read operation is greater than the reference number of correctable error bits, error correction decoding may fail. When error correction decoding fails, the error correction circuit 220 may provide a signal, indicating that error correction decoding on the data read by the read operation has failed, to the operation controller 211.

When error correction decoding has failed on the data read by the read operation, the operation controller 211 may control the memory device 100 to perform a read retry operation. The read retry operation may be an operation of reading data stored in the memory device 100 using a read retry voltage that is a voltage different from the read voltage used in the read operation. The operation controller 211 may control the memory device 100 to perform a read retry operation based on the read retry table 231 stored in the buffer memory 230.

The read retry table 231 may be a table indicating information about read retry voltages to be used for the read retry operation. The read retry voltages included in the read retry table 231 may be preset voltages, by which data including a small number of error bits is expected to be read even though the threshold voltage distributions of memory cells are changed as the memory device 100 repeats a program operation, a read operation, or an erase operation.

The read retry operation may be performed a preset number of times. The read retry operation may be performed a number of times identical to the number of read retry voltages included in the read retry table 231. For example, when the number of read retry voltages included in the read retry table 231 is 'n', the read retry operation may be performed 'n' times. When the read retry operation passes before the read retry operation is performed a preset number of times, the read retry operation may be terminated. When error correction decoding passes on the data that is read using the read retry voltages, the read retry operation may pass. When a read retry operation using one of the read retry voltages fails, a read retry operation using another read retry voltage may be performed.

In an embodiment, each of the read retry voltages may be a hard decision read voltage. The data that is read using the read retry voltage may be hard decision read data. The hard decision read data may be data, the reliability of which is not evaluated through an additional read operation. The hard decision read data may be data identified only depending on whether the threshold voltages of memory cells are higher than or lower than the read retry voltage. Hard decision decoding may mean that error correction decoding is performed only on the hard decision read data.

In an embodiment, the operation controller 211 may store decoding history information, including retry fail voltages which failed in the read retry operation and syndrome weights respectively corresponding to the retry fail voltages, in the decoding history storage 232. Here, the retry fail voltage may be a read retry voltage, with which the corresponding read retry operation fails.

For example, the operation controller 211 may perform a first read retry operation of reading data stored in the memory device 100 using a first read retry voltage. When error correction decoding fails on data that is read using the first read retry voltage, the operation controller 211 may fail in the first read retry operation. When the first read retry operation fails, the operation controller 211 may store the first read retry voltage and a syndrome weight corresponding to the first read retry voltage in the decoding history storage 232.

When the first read retry operation using the first read retry voltage fails, the first read retry voltage may be a retry fail voltage. The syndrome weight may be the number of ones (1s) included in a syndrome generated in error correction decoding. The syndrome may be generated by an operation on a parity check matrix and the data that is read using the corresponding read retry voltage in error correction decoding.

When the number of times that the read retry operation fails reaches the threshold number of times, the read voltage determiner 212 may determine an optimally estimated read voltage corresponding to a minimum syndrome weight based on a graph indicating a relationship between changes in retry fail voltages which failed in the read retry operation and syndrome weights respectively corresponding to the retry fail voltages. The threshold number of times may be less than the preset number of times that is the maximum number of times the read retry operation can be performed. The read voltage determiner 212 may determine the optimally estimated read voltage using retry fail voltages, which are used for the read retry operation performed a threshold number of times, and the syndrome weights.

The minimum syndrome weight may be a weight having the smallest value among syndrome weights and may be obtained from the graph. As the read retry voltage is closer to an optimal read voltage by which data including a smallest number of error bits can be read, the syndrome weight corresponding to the read retry voltage may be estimated to be lower. The read voltage determiner 212 may determine the optimally estimated read voltage corresponding to the minimum syndrome weight. The read voltage determiner 212 may provide the optimally estimated read voltage to the operation controller 211.

The operation controller 211 may read data stored in the memory device 100 using the optimally estimated read voltage. The operation controller 211 may provide the data that is read using the optimally estimated read voltage to the error correction circuit 220. The error correction circuit 220 may perform error correction decoding on the data that is read using the optimally estimated read voltage. When error correction decoding is successful on the data that is read using the optimally estimated read voltage, the operation controller 211 may provide decoded read data to the host 300.

When error correction decoding fails on the data that is read using the optimally estimated read voltage, the error correction circuit 220 may perform soft decision decoding on data that is read using soft read voltages having respective offset values based on the optimally estimated read voltage.

In an embodiment, the buffer memory 230 may temporarily store data provided from the host 300, or may temporarily store data read from the memory device 100. In an embodiment, the buffer memory 230 may be a volatile memory device. For example, the buffer memory 230 may be a dynamic random access memory (DRAM) or a static random access memory (SRAM). In an embodiment, the buffer memory 230 may be located outside the memory controller 200. In an embodiment, the buffer memory 230 may be located outside the memory system 50.

In an embodiment, the buffer memory 230 may store metadata. The metadata may be data including information used to operate the memory system 50. In an embodiment, the metadata may include map data including a corresponding relationship between logical addresses of the host 300 and physical addresses of the memory device 100.

Figure 2:
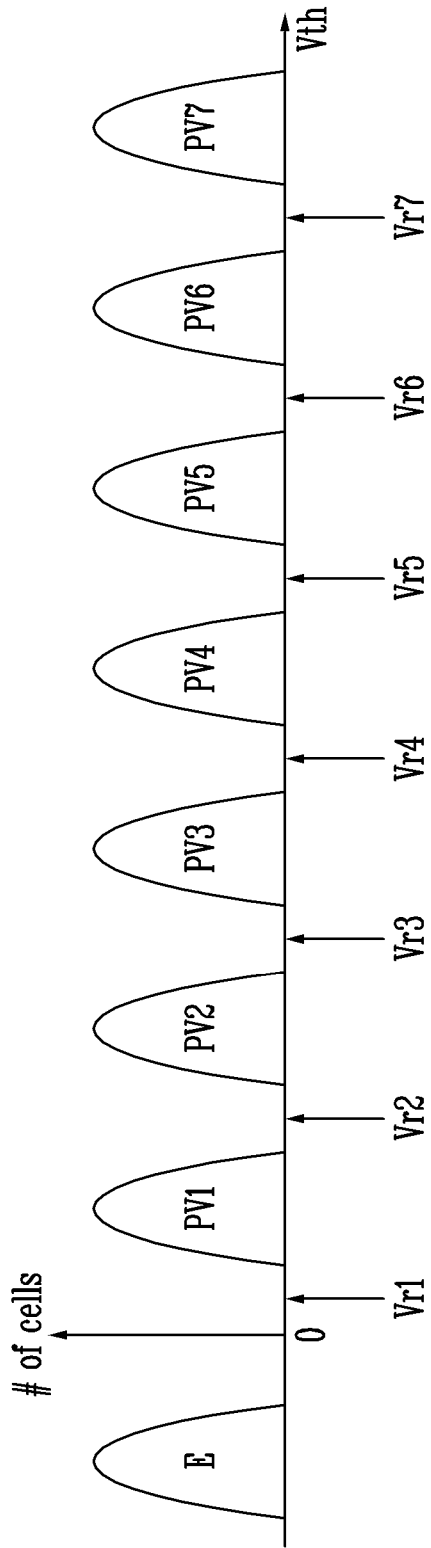
FIG. 2 is a diagram illustrating threshold voltage distributions of memory cells.

FIG. 2 is a diagram illustrating threshold voltage distributions of memory cells.

In FIG. 2, the horizontal axis of a graph indicates threshold voltages Vth of memory cells, and the vertical axis thereof indicates the number of memory cells (# of cells).

In FIG. 2, description will be made based on that memory cells are programmed according to a triple-level cell (TLC) scheme in which one memory cell stores three bits of data. Referring to FIG. 2, the threshold voltage of each of memory cells may be increased to a threshold voltage corresponding to one of an erase state E and first to seventh program states PV1 to PV7 through a program operation. Data stored in the memory cells may vary depending on the program states of the memory cells. In detail, different pieces of data may be stored in the memory cells depending on which of the erase state E and the first to seventh program states PV1 to PV7 the threshold voltage of each memory cell corresponds to. The pieces of data stored in the memory cells may include a plurality of logical pages. The plurality of logical pages may include an LSB page, a CSB page, and an MSB page.

The memory device 100 may perform a read operation of obtaining data stored in the memory cells. In detail, the memory device 100 may obtain data stored in the memory cells based on the voltages of bit lines that are changed when a read voltage is applied to a word line coupled to the memory cells.

In an embodiment, the memory device 100 may perform a read operation on the plurality of logical pages using a plurality of read voltages. The plurality of read voltages may include first to seventh read voltages Vr1 to Vr7. The first to seventh read voltages Vr1 to Vr7 may be voltages for distinguishing the erase state E and the first to seventh program states PV1 to PV7 from each other. For example, the memory device 100 may perform a read operation on an LSB page using the third read voltage Vr3 for distinguishing the erase state E and the first and second program states PV1 and PV2 from the third to seventh program states PV3 to PV7, and the seventh program voltage Vr7 for distinguishing the erase state E and the first to sixth program states PV1 to PV6 from the seventh program state PV7.

Figure 3:
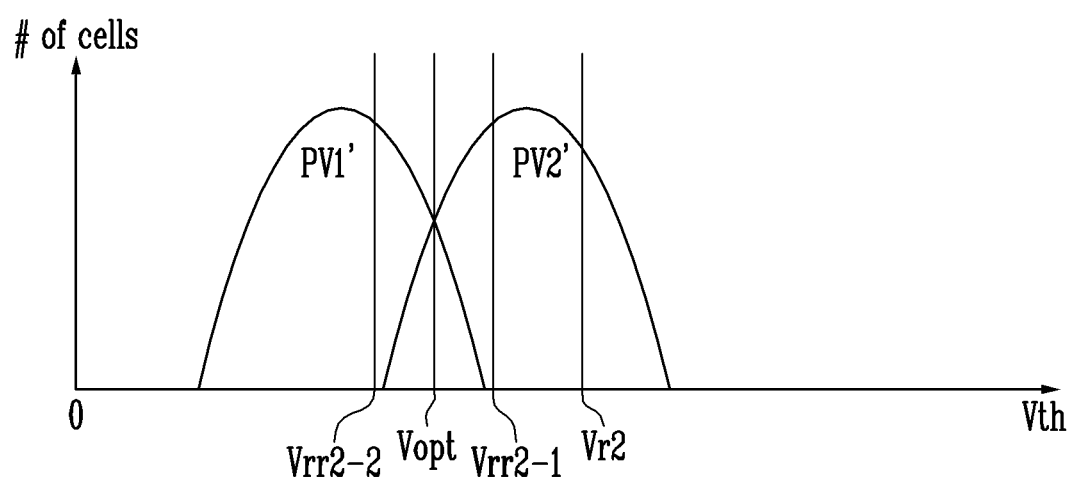
FIG. 3 is a diagram illustrating changed threshold voltage distributions of memory cells.

FIG. 3 is a diagram illustrating changed threshold voltage distributions of memory cells.

In FIG. 3, the horizontal axis of a graph indicates threshold voltages Vth of memory cells, and the vertical axis thereof indicates the number of memory cells (# of cells).

In FIG. 3, the case of cells programmed to threshold voltages corresponding to first and second program states PV1 and PV2, among programmed memory cells, will be described by way of example. Threshold voltage distributions of memory cells having threshold voltages corresponding to the first and second program states PV1 and PV2, illustrated in FIG. 2, may change to threshold voltage distributions of memory cells having threshold voltages corresponding to program states PV1' and PV2' illustrated in FIG. 3, as time elapses. For example, as the number of times that a program and erase operation is performed on the memory cells increases, the threshold voltage distributions of the memory cells may change to the threshold voltage distributions of the memory cells illustrated in FIG. 3.

Accordingly, when data stored in the memory cells is read using a second read voltage Vr2 for distinguishing the first program state PV1' from the second program state PV2', a large number of error bits may be included in the read data. That is, because data that is read using the second read voltage Vr2 includes a large number of error bits, error correction decoding may fail. When error correction decoding fails, a read retry operation of reading data stored in the memory cells using a read retry voltage may be performed.

In an embodiment, the memory system 50 may read data stored in memory cells using a first read retry voltage Vrr2-1 included in a read retry table. However, the data that is read using the first read retry voltage Vrr2-1 may include more error bits than data that is read using an optimal read voltage Vopt. The optimal read voltage Vopt may be a voltage that enables data including a minimum number of error bits to be read.

However, as the difference between the first read retry voltage Vrr2-1 and the optimal read voltage Vopt is larger, there is a strong possibility that error correction decoding on the data that is read using the first read retry voltage Vrr2-1 will fail. When error correction decoding on the data that is read using the first read retry voltage Vrr2-1 fails, the memory system 50 may read the data stored in the memory cells using a second read retry voltage Vrr2-2 included in the read retry table. However, the data that is read using the second read retry voltage Vrr2-2 may also include more error bits than the data that is read using the optimal read voltage Vopt.

The threshold voltage distributions of memory cells may be changed differently depending on a memory block including memory cells. Further, the threshold voltage distribution of the memory cells may be changed differently depending on the position of the word line to which the memory cells are coupled. Accordingly, the first read retry voltage Vrr2-1 and the second read retry voltage Vrr2-2 included in the read retry table are voltages preset based on typically predicted threshold voltage distributions of the memory cells, but may be changed differently from the predicted threshold voltage distributions depending on the operating environment of the memory device. When the threshold voltage distributions are changed differently from the predicted threshold voltage distributions, the difference between the first read retry voltage Vrr2-1 or the second read retry voltage Vrr2-2 included in the read retry table and the optimal read voltage may be large, and thus there may be a strong possibility that error correction decoding on the data that is read using the first read retry voltage Vrr2-1 or the second read retry voltage Vrr2-2 will fail.

FIG. 4 is a diagram illustrating error correction decoding.

Referring to FIG. 4, the error correction circuit of FIG. 1 may perform error correction decoding on data that is read using a read retry voltage. The error correction circuit 220 may determine whether error correction decoding has passed or failed, based on a syndrome weight included in a syndrome Si generated through an operation on a parity check matrix H and the data that is read using the read retry voltage.

The error correction circuit 220 may generate the syndrome Si based on the parity check matrix H and the transposition $Ci^T$ of hard decision data Ci corresponding to an i-th repetition during error correction decoding. First hard decision read data C1 may be data that is read using the read retry voltage. Entries of the hard decision data Ci may indicate hard decision values of variable nodes corresponding to the i-th repetition.

The error correction circuit 220 may calculate a syndrome weight based on the generated syndrome. The syndrome weight may indicate the number of 1s included in the syndrome. When the syndrome weight is 0, it may be determined that data includes no error bits. When the syndrome weight is 0, error correction decoding may pass. When the syndrome weight is not 0, it may be determined that the data includes error bits. When the syndrome weight is not 0, error correction decoding may fail. Further, as the syndrome weight is lower, the number of error bits included in data may be smaller. As the syndrome weight is higher, the number of error bits included in data may be larger.

Figure 5:
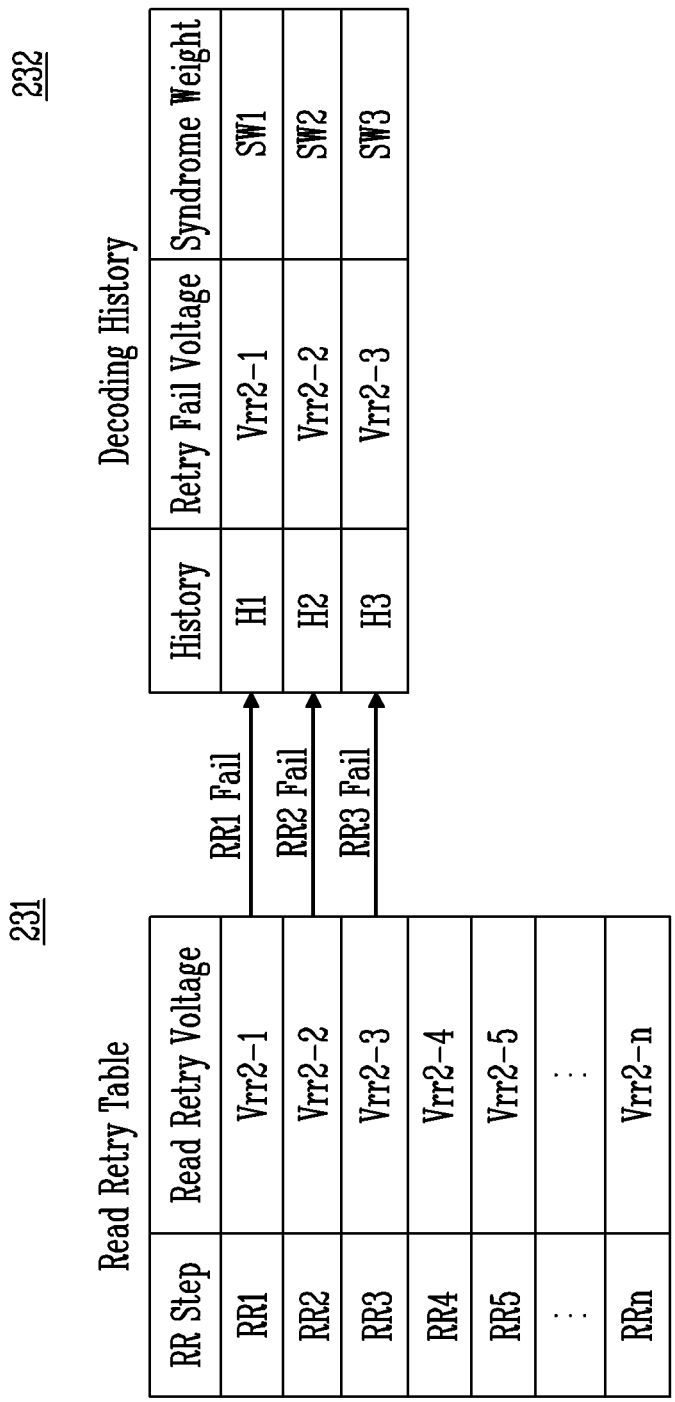
FIG. 5 is a diagram illustrating a decoding history storage according to an embodiment of the present disclosure.

FIG. 5 is a diagram illustrating a decoding history storage according to an embodiment of the present disclosure.

Referring to FIGS. 1 and 5, the read retry table 231 may include information about read retry voltages to be used for a read retry operation. In FIG. 5, description will be made based on read retry voltages related to a second read voltage Vr2 for distinguishing a first program state from a second program state. An embodiment of the present disclosure may be equally applied to a first read voltage Vr1 and third to seventh read voltages Vr3 to Vr7 which are illustrated in FIG. 2.

The decoding history storage 232 may store decoding history information including each retry fail voltage which failed in the read retry operation and a syndrome weight corresponding to the retry fail voltage. The syndrome weight may be the number of 1s included in a syndrome generated in error correction decoding on data that is read using the corresponding retry fail voltage.

In an embodiment, the memory system 50 may perform a read retry operation based on the read retry table. In detail, the memory system 50 may perform a first read retry operation RR1 of reading data stored in the memory device using a first read retry voltage Vrr2-1. The memory system 50 may perform error correction decoding on data that is read using the first read retry voltage Vrr2-1. When the first read retry operation RR1 fails, the memory system 50 may store the first read retry voltage Vrr2-1 and a first syndrome weight SW1 corresponding to the first read retry voltage Vrr2-1. The first syndrome weight SW1 may be the number of 1s included in the syndrome generated in error correction decoding performed on the data that is read using the first read retry voltage Vrr2-1. The first read retry voltage Vrr2-1 and the first syndrome weight SW1 may be stored, as first decoding history information H1, in the decoding history storage 232.

When the first read retry operation RR1 fails, the memory system 50 may perform a second read retry operation RR2 of reading data stored in the memory device using a second read retry voltage Vrr2-2. The memory system 50 may perform error correction decoding on data that is read using the second read retry voltage Vrr2-2. When the second read retry operation RR2 fails, the memory system 50 may store the second read retry voltage Vrr2-2 and a second syndrome weight SW2 corresponding to the second read retry voltage Vrr2-2. The second read retry voltage Vrr2-2 and the second syndrome weight SW2 may be stored, as second decoding history information H2, in the decoding history storage 232.

When the second read retry operation RR2 fails, the memory system 50 may perform a third read retry operation RR3 of reading data stored in the memory device using a third read retry voltage Vrr2-3. The memory system 50 may perform error correction decoding on data that is read using the third read retry voltage Vrr2-3. When the third read retry operation RR3 fails, the memory system 50 may store the third read retry voltage Vrr2-3 and a third syndrome weight SW3 corresponding to the third read retry voltage Vrr2-3. The third read retry voltage Vrr2-3 and the third syndrome weight SW3 may be stored, as third decoding history information H3, in the decoding history storage 232.

In an embodiment, when the number of times that the read retry operation fails reaches the threshold number of times, the memory system 50 may determine an optimally estimated read voltage based on the retry fail voltages and syndrome weights respectively corresponding to the retry fail voltages. For example, in FIG. 5, the threshold number of times may be 3.

In an embodiment, when the first to third read retry operations RR1 to RR3 fail among the first to n-th read retry operations RR1 to RRn, the memory system 50 may determine the optimally estimated read voltage based on pieces of first to third decoding history information H1 to H3. A method of determining the optimally estimated read voltage will be described in detail below with reference to FIG. 6.

FIG. 6 is a diagram illustrating an operation of determining an optimally estimated read voltage based on decoding history information according to an embodiment of the present disclosure.

In FIG. 6, the horizontal axis of an upper graph indicates threshold voltages Vth of memory cells, and the vertical axis thereof indicates the number of memory cells (# of cells). In FIG. 6, the horizontal axis of a lower graph indicates voltages, and the vertical axis thereof indicates syndrome weights.

Referring to FIG. 6, when first to third read retry operations fail, the memory system 50 may determine a minimum syndrome weight based on a graph indicating a relationship between changes in the first to third syndrome weights relative to the magnitudes of the first to third read retry voltages Vrr2-1 to Vrr2-3. The memory system 50 may determine a voltage corresponding to the minimum syndrome weight to be an optimally estimated read voltage Ves.

In an embodiment, the memory system 50 may derive a quadratic equation in which the first to third read retry voltages are located on a horizontal axis (x axis) and the first to third syndrome weights are located on a vertical axis (y axis). Because the memory system 50 stores three coordinates, that is, pieces of first to third decoding history information H1 to H3, parameters a, b, and c may be obtained in the quadratic equation $y=ax^2+bx+c$. Further, among the syndrome weights on a quadratic function graph representing the quadratic equation, the minimum syndrome weight may be a point at which the slope of the quadratic function graph is 0. A point at which the slope of the quadratic function graph is 0 may be a point at which the result of differentiating the quadratic equation is $x=-b/2a$. That is, the memory system 50 may determine a value of $-b/2a$ to be the optimally estimated read voltage Ves. That is, the memory system 50 may derive the quadratic function graph based on the pieces of first to third decoding history information H1 to H3 related to the fails in the first to third read retry operations, and may determine the optimally estimated read voltage Ves corresponding to the minimum syndrome weight among the syndrome weights based on the derived graph.

Furthermore, as illustrated in FIG. 6, the magnitude of the optimal read voltage Vopt may be different from that of the optimally estimated read voltage Ves. However, the absolute value of the difference between the magnitudes of the optimally estimated read voltage Ves and the optimal read voltage Vopt may be less than that of the difference between the magnitudes of the optimally estimated read voltage Ves and the first to third read retry voltages Vrr2-1 to Vrr2-3. Because the absolute value of the difference between the magnitudes of the optimally estimated read voltage Ves and the optimal read voltage Vopt is small, there may be a strong possibility that data that is read using the optimally estimated read voltage Ves will include fewer error bits, and there may be a high probability that error correction decoding will pass.

Furthermore, the memory system 50 may determine the optimally estimated read voltage Ves having the small difference in magnitude from the optimal read voltage Vout without performing all of the first to n-th read retry operations included in the read retry table, thus enabling error correction decoding to pass and reducing the time required to obtain decoded read data.

Furthermore, because there is a strong possibility that, even though error correction decoding fails on the data that is read using the optimally estimated read voltage, an optimal read voltage will be included in soft read voltages having respective offset values based on the optimally estimated read voltage, there may be a strong possibility that soft decision decoding on the data that is read using soft read voltages will pass.

FIG. 7 is a diagram illustrating a decoding history storage according to an embodiment of the present disclosure.

Referring to FIG. 7, the read retry table 231 may include information about read retry voltages to be used for a read retry operation. The decoding history storage 232 may store decoding history information including retry fail voltages which failed in the read retry operation and syndrome weights respectively corresponding to the retry fail voltages.

In an embodiment, the memory system 50 may perform a read retry operation based on the read retry table. In detail, the memory system 50 may sequentially perform first to fifth read retry operations RR1 to RR5 of reading data stored in the memory device using first to fifth read retry voltages Vrr2-1 to Vrr2-5. Here, the fact that the first to fifth read retry operations RR1 to RR5 are sequentially performed may mean that first to fourth read retry operations RR1 to RR4 have failed.

The memory system 50 may store pieces of first to fifth decoding history information H1 to H5, each including a corresponding one of first to fifth read retry voltages Vrr2-1 to Vrr2-5 and a corresponding one of first to fifth syndrome weights SW1 to SW5, in the decoding history storage 232 while performing the first to fifth read retry operations RR1 to RR5.

When the fifth read retry operation RR5 fails, the memory system 50 may determine the optimally estimated read voltage corresponding to the minimum syndrome weight based on a relationship between changes in the first to fifth syndrome weights SW1 to SW5 relative to the first to fifth read retry voltages Vrr2-1 to Vrr2-5 included in the pieces of first to fifth decoding history information H1 to H5. A method of determining the optimally estimated read voltage will be described in detail below with reference to FIG. 8.

Figure 8:
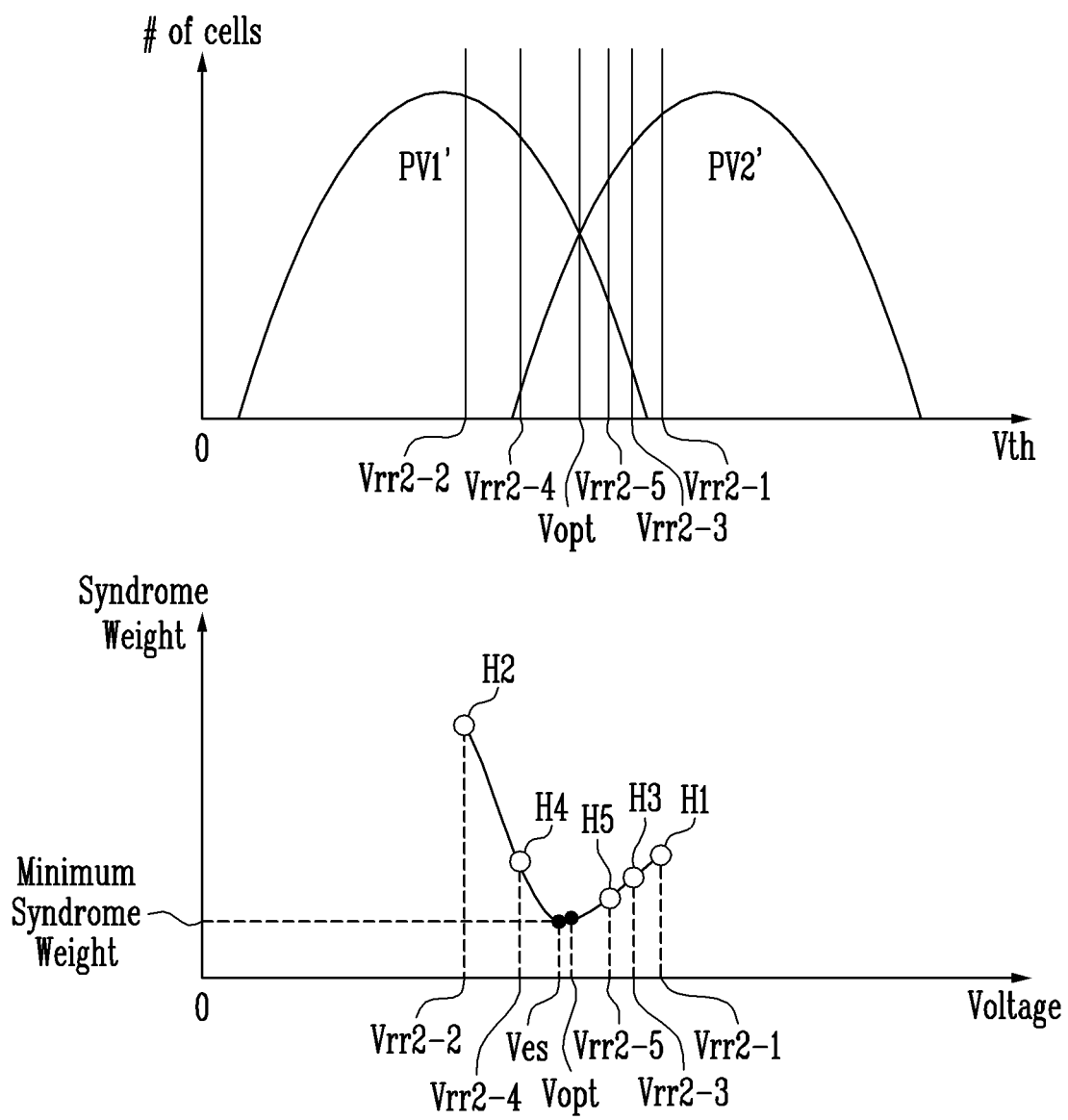
FIG. 8 is a diagram illustrating an operation of determining an optimally estimated read voltage based on decoding history information according to an embodiment of the present disclosure.

FIG. 8 is a diagram illustrating an operation of determining an optimally estimated read voltage based on decoding history information according to an embodiment of the present disclosure.

In FIG. 8, the horizontal axis of an upper graph indicates threshold voltages Vth of memory cells, and the vertical axis thereof indicates the number of memory cells (# of cells). In FIG. 8, the horizontal axis of a lower graph indicates voltages, and the vertical axis thereof indicates syndrome weights.

Referring to FIG. 8, when the fifth read retry operation RR5 fails, the processor 210 may derive a graph indicating a relationship between changes in first to fifth syndrome weights relative to first to fifth read retry voltages using a regression analysis algorithm. The graph may be the result of performing curve fitting on the pieces of first to fifth decoding history information H1 to H5, each including a corresponding one of the first to fifth read retry voltages and a corresponding one of the first to fifth syndrome weights, using the regression analysis algorithm. Curve fitting may be an operation of drawing a curve estimated based on the pieces of first to fifth decoding history information H1 to H5.

The processor 210 may determine the minimum syndrome weight among syndrome weights on the graph drawn using the regression analysis algorithm, and may determine the optimally estimated read voltage Ves corresponding to the minimum syndrome weight.

The absolute value of the difference between the magnitudes of the optimally estimated read voltage Ves illustrated in FIG. 8 and the optimal read voltage Vopt may be less than that of the difference between the magnitudes of the optimally estimated read voltage Ves illustrated in FIG. 6 and the optimal read voltage Vopt. Because, in FIG. 8, the optimally estimated read voltage has been determined using the five pieces of decoding history information, the optimally estimated read voltage closer to the optimal read voltage than the optimally estimated read voltage of FIG. 6, which is determined using three pieces of decoding history information, may be determined. The memory system 50 may improve the probability that error correction decoding will pass by reading data stored in the memory device using an optimally estimated read voltage having a smaller difference from the optimal read voltage.

Figure 9:
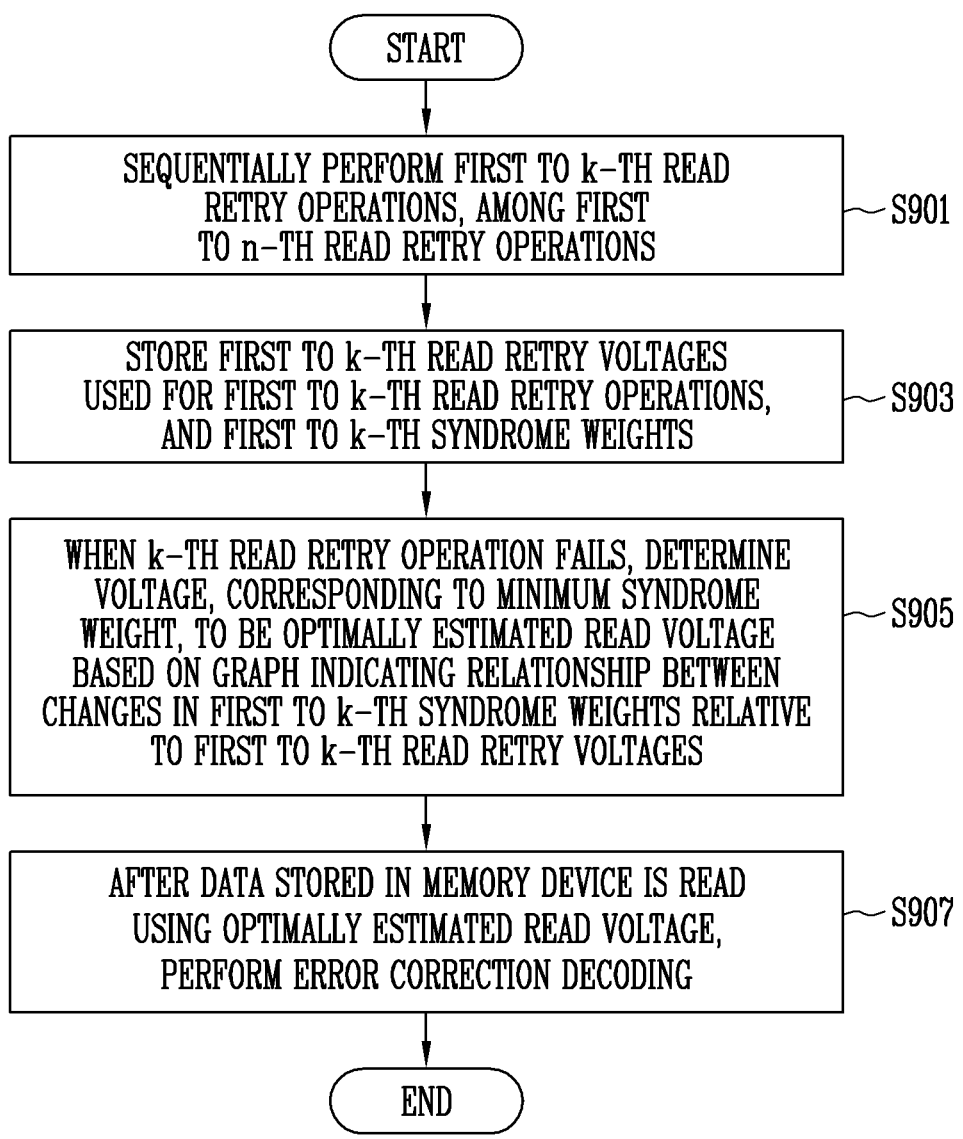
FIG. 9 is a flowchart illustrating the operation of a memory system according to an embodiment of the present disclosure.

FIG. 9 is a flowchart illustrating the operation of a memory system according to an embodiment of the present disclosure.

Referring to FIG. 9, at operation S901, the memory system 50 may sequentially perform first to k-th read retry operations among first to n-th read retry operations.

At operation S903, the memory system 50 may store first to k-th read retry voltages, which failed in the first to k-th read retry operations, and first to k-th syndrome weights. Each of the first to k-th syndrome weights may be the number of 1s included in the corresponding syndrome generated in error correction decoding performed on the data that is read using a corresponding one of the first to k-th read retry voltages.

At operation S905, when the k-th read retry operation has failed, the memory system 50 may determine the optimally estimated read voltage corresponding to a minimum syndrome weight based on a graph indicating a relationship between changes in the first to k-th syndrome weights relative to the first to k-th read retry voltages. The minimum syndrome weight may be the smallest value among syndrome weights and may be obtained from the graph. In an embodiment, the k-th read retry operation may be a third read retry operation, as described above with reference to FIGS. 5 and 6. In an embodiment, the k-th read retry operation may be a fifth read retry operation, as described above with reference to FIGS. 7 and 8.

At operation S907, the memory system 50 may read data stored in the memory device using the optimally estimated read voltage, and thereafter perform error correction decoding. Error correction decoding on data that is read using the optimally estimated read voltage may be hard decision decoding. In an embodiment, when the hard decision decoding fails, the memory system 50 may read data stored in the memory device using soft read voltages having respective offset values based on the optimally estimated read voltage, and may perform soft decision decoding on the read data.

Figure 10:
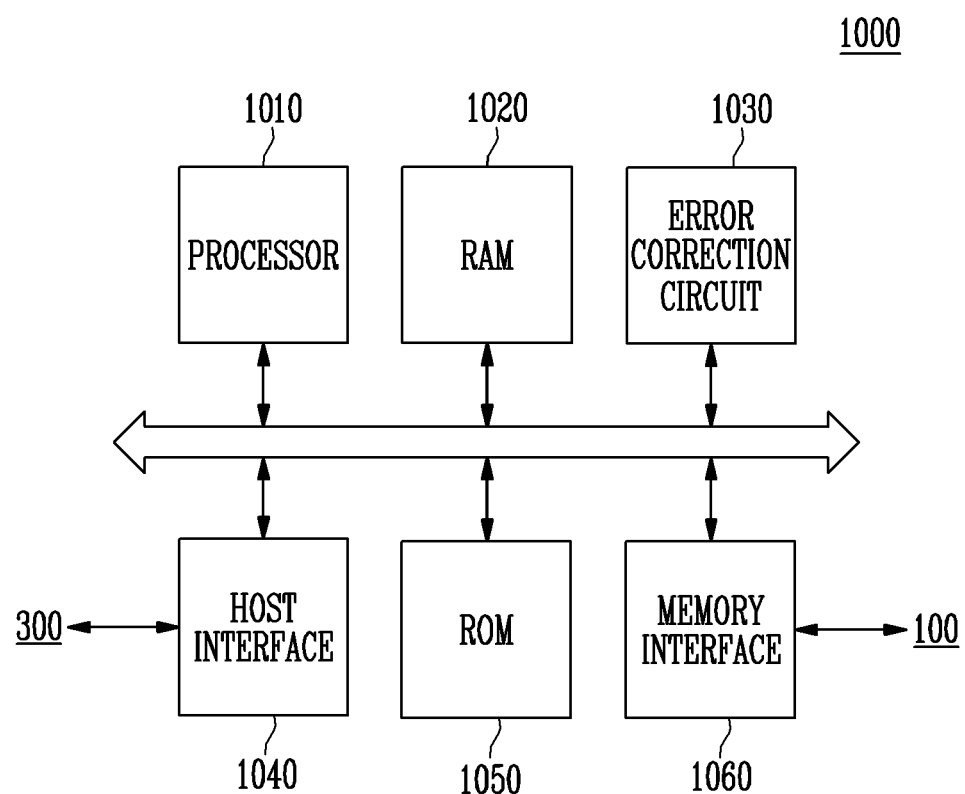
FIG. 10 is a diagram illustrating the memory controller of FIG. 1.

FIG. 10 is a diagram illustrating the memory controller of FIG. 1.

The memory controller 1000 of FIG. 10 may be the memory controller 200 of FIG. 1.

Referring to FIG. 10, the memory controller 1000 may include a processor 1010, a random access memory (RAM) 1020, an error correction circuit 1030, a host interface 1040, a read only memory (ROM) 1050, and a memory interface 1060.

The processor 1010 may control the overall operation of the memory controller 1000. The processor 1010 may control the operation of the memory controller 1000 to store data requested by a host 300 in the memory device 100. In an embodiment, the processor 210 illustrated in FIG. 1 may be implemented in the same manner as the processor 1010 of FIG. 10. In an embodiment, the processor 1010 may read data stored in the memory device 100 using read retry voltages or an optimally estimated read voltage. In an embodiment, the processor 1010 may determine a voltage corresponding to a minimum syndrome weight to be an optimally estimated read voltage based on a graph indicating a relationship between changes in retry fail voltages which failed in a read retry operation and syndrome weights respectively corresponding to the retry fail voltages.

The RAM 1020 may be used as a buffer memory, a cache memory or a working memory of the memory controller 1000. In an embodiment, the buffer memory 230 illustrated in FIG. 1 may be included in the RAM 1020. In an embodiment, the RAM 1020 may store a read retry table, including information about the read retry voltages, and decoding history information, including retry fail voltages which failed in the read retry operation and syndrome weights respectively corresponding to the retry fail voltages.

The error correction circuit 1030 may perform error correction. The error correction circuit 1030 may perform error correction code (ECC) encoding based on data to be written to the memory device 100 through the memory interface 1060. The ECC-encoded data may be transferred to the memory device 100 through the memory interface 1060. The error correction circuit 1030 may perform error correction decoding (ECC decoding) on data received from the memory device 100 through the memory interface 1060. In an embodiment, the error correction circuit 220 illustrated in FIG. 1 may be implemented in the same manner as the error correction circuit 1030 of FIG. 10. In an embodiment, the error correction circuit 1030 may perform error correction decoding of correcting errors in data that is read using the read retry voltages or the optimally estimated read voltage.

The ROM 1050 may store various types of information required for the operation of the memory controller 1000 in the form of firmware.

The memory controller 1000 may communicate with an external device (e.g., the host 300, an application processor, or the like) through the host interface 1040. The memory controller 1000 may be provided with data through the host interface 1040. In an embodiment, the host interface 1040 may receive a read request from the host 300.

The memory controller 1000 may communicate with the memory device 100 through the memory interface 1060. The memory controller 1000 may transmit a command, an address, a control signal, etc. to the memory device 100 and receive data from the memory device 100 through the memory interface 1060.

Figure 11:
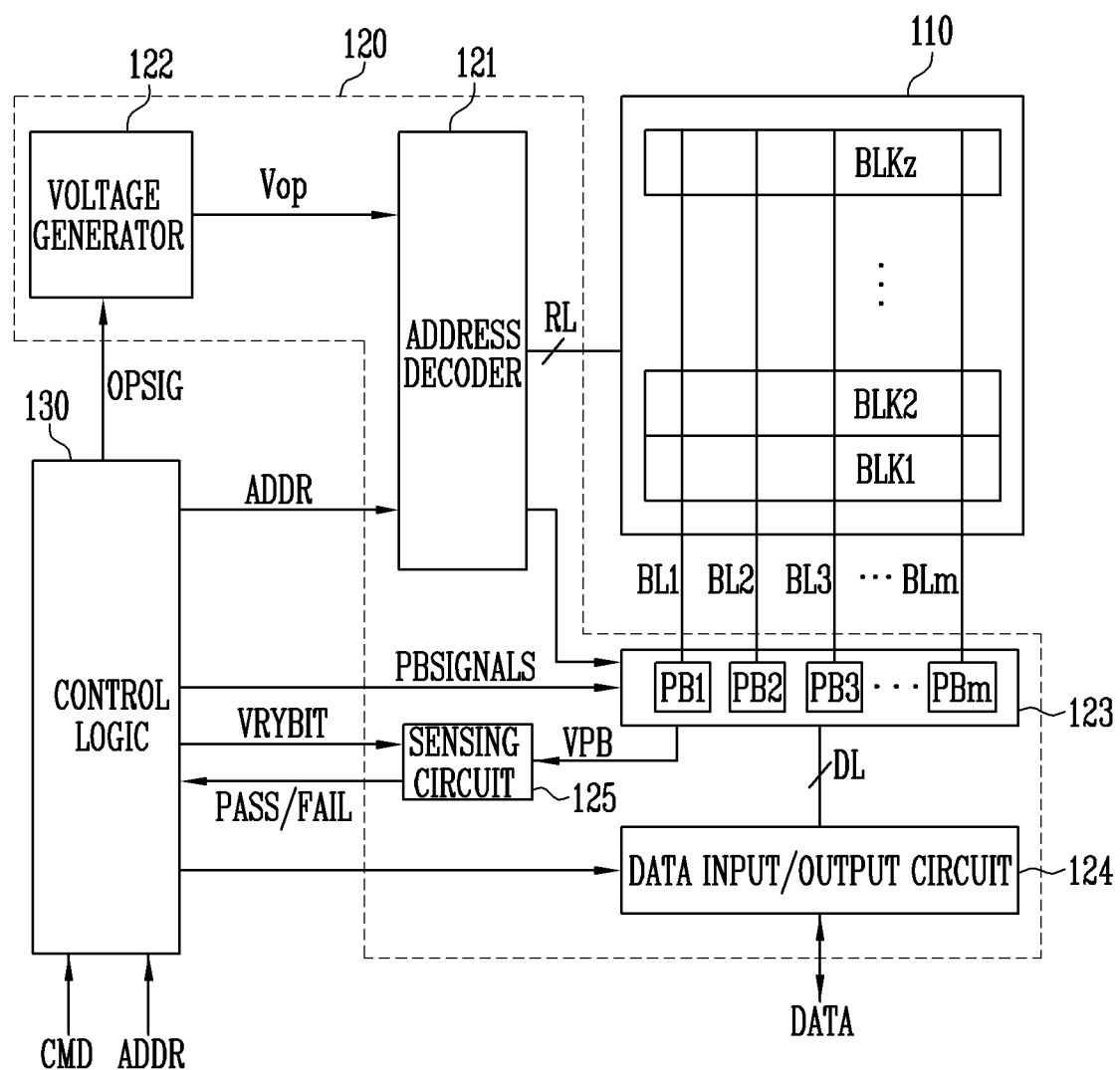
FIG. 11 is a diagram illustrating the memory device of FIG. 1.

FIG. 11 is a diagram illustrating the memory device of FIG. 1.

Referring to FIG. 11, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells. Memory cells coupled to the same word line, among the plurality of memory cells, may be defined as one physical page. In an embodiment, a physical page may be the unit by which data is stored or stored data is read. One physical page may include a plurality of logical pages. A memory block may be the unit by which data is erased.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, a quad-level cell (QLC) capable of storing four bits of data, or a memory cell capable of storing five or more bits of data.

The peripheral circuit 120 may drive the memory cell array 110. In an example, the peripheral circuit 120 may drive the memory cell array 110 to perform a program operation, a read operation, and an erase operation under the control of the control logic 130. In an example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 may be coupled to the memory cell array 110 through the row lines RL. The row lines RL may include drain select lines, word lines, source select lines, and a source line. In an embodiment, the word lines may include normal word lines and dummy word lines. In an embodiment, the row lines RL may further include a pipe select line.

The address decoder 121 may be operated under the control of the control logic 130. The address decoder 121 may receive addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage having a level higher than that of the read voltage to unselected word lines.

The address decoder 121 may decode a column address among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages. The plurality of operating voltages Vop may be supplied to the memory cell array 110 by the address decoder 121.

The page buffer group 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm may receive data DATA through the data input/output circuit 124 and data lines DL.

During a program operation, the first to m-th page buffers PB1 to PBm may transfer data DATA, received through the data input/output circuit 124, to selected memory cells through the bit lines BL1 to BLm. The memory cells in the selected page may be programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a verify operation, the first to m-th page buffers PB1 to PBm may read the data DATA stored in the selected memory cells from the selected memory cells through the bit lines BL1 to BLm.

During a read operation, the page buffer group 123 may read data DATA from the memory cells in the selected page through the bit lines BL1 to BLm, and may store the read data DATA in the first to m-th page buffers PB1 to PBm.

The data input/output circuit 124 may be coupled to the first to m-th page buffers PB1 to PBm through the data lines DL. The data input/output circuit 124 may be operated under the control of the control logic 130.

The data input/output circuit 124 may include a plurality of input/output buffers (not illustrated) which receive input data DATA. During a program operation, the data input/output circuit 124 may receive the data DATA to be stored from the memory controller. During a read operation, the data input/output circuit 124 may output the data DATA, received from the first to m-th page buffers PB1 to PBm included in the page buffer group 123, to the memory controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the page buffer group 123 with a reference voltage generated by the reference current. In an example, the sensing circuit 125 may output a pass signal to the control logic 130 when the magnitude of the sensing voltage VPB is greater than that of the reference voltage. In an example, the sensing circuit 125 may output a fail signal to the control logic 130 when the magnitude of the sensing voltage VPB is less than that of the reference voltage.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to a command CMD transferred from an external device.

The control circuit 130 may control the peripheral circuit 120 by generating various types of signals in response to the command CMD and an address ADDR. For example, the control logic 130 may generate the operation signal OPSIG, the addresses ADDR, page buffer control signals PBSIGNALS, and the enable bit signal VRYBIT in response to the command CMD and the address ADDR. The control logic 130 may output the operation signal OPSIG to the voltage generator 122, may output the addresses ADDR to the address decoder 121, may output the page buffer control signals PBSIGNALS to the page buffer group 123, and may output the enable bit signal VRYBIT to the sensing circuit 125. In addition, the control logic 130 may determine whether a verify operation has passed or failed in response to the pass or fail signal PASS or FAIL output from the sensing circuit 125.

According to the present disclosure, there are provided a memory controller that is capable of reading data including a small number of error bits, and a memory system including the memory controller.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller, comprising:
   an error correction circuit configured to perform error correction decoding on data that is read by read retry operations;
   a buffer memory configured to store decoding history information including retry fail voltages which failed in the read retry operations and syndrome weights respectively corresponding to the retry fail voltages; and
   a processor configured to:
   determine, when a number of times that the read retry operations fail reaches a threshold number of times, a minimum syndrome weight based on a relationship between changes in the syndrome weights relative to the retry fail voltages, determine an optimally estimated read voltage corresponding to the minimum syndrome weight, and
provide data that is read using the optimally estimated read voltage to the error correction circuit,
wherein the error correction circuit is further configured to:
perform the error correction decoding on the data that is read using the optimally estimated read voltage, and
perform, when the error correction decoding fails on the data that is read using the optimally estimated read voltage, soft decision decoding on data that is read using soft read voltages having respective offset values based on the optimally estimated read voltage.

2. The memory controller according to claim 1, wherein the processor is configured to determine the minimum syndrome weight among syndrome weights from a graph indicating the relationship.

3. The memory controller according to claim 2, wherein the graph indicates a result of performing curve fitting on the retry fail voltages and the syndrome weights using a regression analysis algorithm.

4. The memory controller according to claim 1, wherein the minimum syndrome weight is a smallest value among syndrome weights and obtained from a graph of an equation derived based on the relationship.

5. The memory controller according to claim 1, wherein each of the syndrome weights is a number of ones (1s) included in a syndrome generated in the error correction decoding.

6. The memory controller according to claim 1, wherein the read retry operation fails when the syndrome weight calculated in the error correction decoding is not 0.

7. The memory controller according to claim 1, wherein the retry fail voltages are hard decision read voltages.

8. The memory controller according to claim 1, wherein the optimally estimated read voltage is a voltage for reading one of a plurality of pieces of logical page data included in data stored in a memory device.

9. A method of operating a memory controller, comprising:
sequentially performing first to k-th read retry operations among first to n-th read retry operations;
storing first to k-th read retry voltages used for the respective first to k-th read retry operations and first to k-th syndrome weights corresponding to the respective first to k-th read retry voltages;
determining, when the first to k-th read retry operations fail, a minimum syndrome weight based on a relationship between changes in the first to k-th syndrome weights relative to the first to k-th read retry voltages;
determining an optimally estimated read voltage corresponding to the minimum syndrome weight;
reading data stored in a memory device using the optimally estimated read voltage, the reading the data stored in the memory device comprising performing hard decision decoding of correcting errors in the data that is read using the optimally estimated read voltage; and
performing, when the hard decision decoding fails, soft decision decoding on data that is read using soft read voltages having respective offset values based on the optimally estimated read voltage.

10. The method according to claim 9, wherein the minimum syndrome weight is a smallest weight among syndrome weights and obtained from a graph indicating the relationship.

11. The method according to claim 10, wherein the graph indicates a result of performing curve fitting on the first to k-th read retry voltages and the first to k-th syndrome weights using a regression analysis algorithm.

12. The method according to claim 9, wherein the failure of the k-th read retry operation is determined based on a result of error correction decoding performed on data that is read using the k-th read retry voltage.

13. The method according to claim 9, wherein each of the first to k-th read retry voltages is a voltage for reading one of a plurality of pieces of logical page data included in data stored in the memory device.

14. A memory system, comprising:
a memory device; and
a memory controller configured to:
determine a minimum syndrome weight based on a graph indicating a relationship between retry fail voltages and respectively corresponding syndrome weights, and
control the memory device to read data stored in the memory device using an optimally estimated read voltage corresponding to the minimum syndrome weight,
wherein the retry fail voltages are used for up to one of a plurality of read retry operations of reading data stored in the memory device using respective read retry voltages having different magnitudes,
wherein the memory controller is further configured to:
perform an error correction decoding on the data that is read using the optimally estimated read voltage, and
perform, when the error correction decoding fails on the data that is read using the optimally estimated read voltage, soft decision decoding on data that is read using soft read voltages having respective offset values based on the optimally estimated read voltage.

15. The memory system according to claim 14, wherein the memory controller controls the memory device to perform the plurality of read retry operations, and
wherein read retry operations performed up to the read retry operation of the plurality of read retry operations are failed read retry operations.

16. The memory system according to claim 15, wherein the failed read retry operations are operations in which hard decision decoding on data that is read using the retry fail voltages fails.

17. The memory system according to claim 14, wherein the minimum syndrome weight is a smallest value among the syndrome weights and obtained from the graph.

* * * * *